United States Patent
Py

(10) Patent No.: US 10,414,559 B2
(45) Date of Patent: Sep. 17, 2019

(54) DEVICE WITH CO-EXTRUDED BODY AND FLEXIBLE INNER BLADDER AND RELATED APPARATUS AND METHOD

(71) Applicant: Dr. Py Institute LLC, New Milford, CT (US)

(72) Inventor: Daniel Py, Larchmont, NY (US)

(73) Assignee: DR. PY INSTITUTE LLC, New Milford, CT (US)

( * ) Notice: Subject to any disclaimer, the term of this patent is extended or adjusted under 35 U.S.C. 154(b) by 0 days.

(21) Appl. No.: 15/608,864

(22) Filed: May 30, 2017

(65) Prior Publication Data

US 2018/0022515 A1 Jan. 25, 2018

Related U.S. Application Data

(63) Continuation of application No. 14/930,896, filed on Nov. 3, 2015, now Pat. No. 9,663,274, which is a
(Continued)

(51) Int. Cl.

| | | |
|---|---|---|
| *B65D 47/24* | (2006.01) | |
| *B29C 48/09* | (2019.01) | |
| *B65D 23/02* | (2006.01) | |
| *B65D 47/32* | (2006.01) | |
| *B05B 11/00* | (2006.01) | |
| *B65D 47/20* | (2006.01) | |
| *B29C 48/08* | (2019.01) | |
| *B29C 48/10* | (2019.01) | |
| *B29C 48/21* | (2019.01) | |
| *B29C 48/23* | (2019.01) | |

(Continued)

(52) U.S. Cl.
CPC .......... *B65D 47/24* (2013.01); *B05B 11/3028* (2013.01); *B29C 48/09* (2019.02); *B65D 23/02* (2013.01); *B65D 47/205* (2013.01); *B65D 47/32* (2013.01); *B29C 48/08* (2019.02); *B29C 48/10* (2019.02); *B29C 48/21* (2019.02); *B29C 48/23* (2019.02); *B29C 49/04* (2013.01); *B29L 2009/00* (2013.01); *B29L 2031/7158* (2013.01)

(58) Field of Classification Search
CPC ........ B65D 47/24; B65D 23/02; B65D 47/32; B65D 47/205; B05B 11/3028; B29C 47/0023; B29C 47/068; B29C 47/0021; B29C 47/0026; B29C 47/065; B29C 49/04; B29L 2031/7158; B29L 2009/00
See application file for complete search history.

(56) References Cited

U.S. PATENT DOCUMENTS 3,252,447 A 5/1966 Ramer
3,507,586 A 4/1970 Gronemeyer et al.
(Continued)

*Primary Examiner* — Donnell A Long
(74) *Attorney, Agent, or Firm* — McCarter & English, LLP

(57) ABSTRACT

A device comprises a first portion including a first polymer, and a second portion that is relatively flexible in comparison to the first portion and includes a second polymer that is substantially not bondable to the first polymer. A chamber of the device is hermetically sealable with respect to ambient atmosphere and is defined by (i) an interior of the second portion, and/or (ii) a space formed between the first and second portions. A third portion of the device includes a third polymer that is bondable to the first and second polymers and fixedly secures the first and second portions to each other.

28 Claims, 5 Drawing Sheets

Related U.S. Application Data continuation of application No. 13/847,277, filed on Mar. 19, 2013, now Pat. No. 9,211,983, which is a continuation of application No. 12/577,126, filed on Oct. 9, 2009, now Pat. No. 8,397,950.

(60) Provisional application No. 61/104,613, filed on Oct. 10, 2008.

(51) Int. Cl.
   *B29C 49/04* (2006.01)
   *B29L 9/00* (2006.01)
   *B29L 31/00* (2006.01)

(56) References Cited

U.S. PATENT DOCUMENTS

| | | |
|---|---|---|
| 3,820,689 A | 6/1974 | Cocita |
| 4,098,434 A | 7/1978 | Uhlig |
| 4,457,455 A | 7/1984 | Meshberg |
| 4,545,510 A | 10/1985 | Mettenbrink |
| 4,564,130 A | 1/1986 | Eulenburg |
| 4,565,306 A | 1/1986 | Nakanishi et al. |
| 4,651,904 A | 3/1987 | Schuckmann |
| 4,830,229 A | 5/1989 | Ball |
| 4,842,165 A | 6/1989 | Van Coney |
| 4,865,224 A | 9/1989 | Streck |
| 5,082,150 A | 1/1992 | Steiner et al. |
| 5,156,300 A | 10/1992 | Spahni et al. |
| 5,718,982 A | 2/1998 | Kawachi et al. |
| 7,108,676 B2 * | 9/2006 | Loging .............. A47G 19/2272 220/714 |
| 7,322,491 B2 | 1/2008 | Py et al. |
| 2004/0256026 A1 * | 12/2004 | Py ............... A61J 1/18 141/329 |
| 2005/0103802 A1 | 5/2005 | Alberg |
| 2006/0065677 A1 | 3/2006 | Py et al. |
| 2006/0131340 A1 * | 6/2006 | Py ............... B65D 35/46 222/212 |
| 2006/0186139 A1 | 8/2006 | Laidler et al. |
| 2006/0186140 A1 | 8/2006 | Kanfer et al. |
| 2006/0231643 A1 | 10/2006 | Laidler et al. |
| 2007/0012723 A1 | 1/2007 | Laidler et al. |
| 2007/0138209 A1 | 6/2007 | Knauer et al. |
| 2007/0283666 A1 | 12/2007 | Py et al. |
| 2009/0032554 A1 | 2/2009 | Laidler et al. |
| 2009/0173751 A1 | 7/2009 | Laidler et al. |
| 2010/0127018 A1 | 5/2010 | Laidler et al. |
| 2010/0140299 A1 | 6/2010 | Sweeton et al. |

* cited by examiner

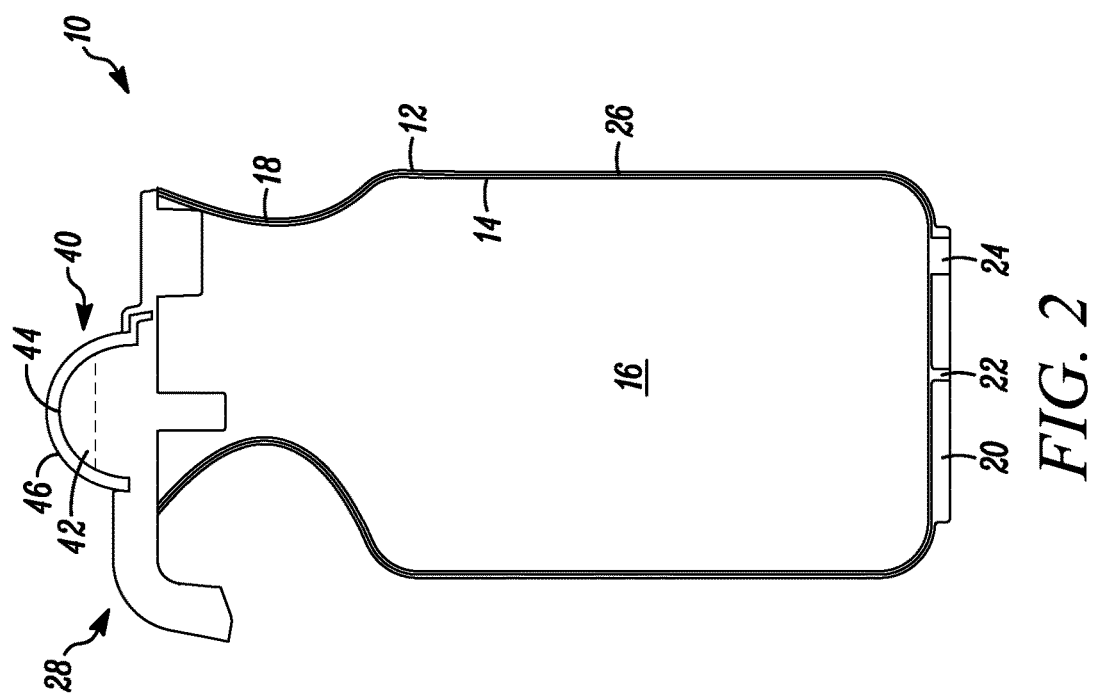

DEVICE WITH CO-EXTRUDED BODY AND FLEXIBLE INNER BLADDER AND RELATED APPARATUS AND METHOD

CROSS REFERENCE TO RELATED APPLICATIONS

This patent application is a continuation of U.S. patent application Ser. No. 14/930,896, filed Nov. 3, 2015, now U.S. Pat. No. 9,663,274 issued May 30, 2017, which is a continuation of U.S. patent application Ser. No. 13/847,277, filed Mar. 19, 2013, now U.S. Pat. No. 9,211,983 issued Dec. 15, 2015, which is a continuation of U.S. patent application Ser. No. 12/577,126, filed Oct. 9, 2009, now U.S. Pat. No. 8,397,950 issued Mar. 19, 2013, which claims the benefit under 35 U.S.C. § 119(e) of U.S. Provisional Patent Application No. 61/104,613, filed Oct. 10, 2008, entitled "Device with Co-Extruded Body and Flexible Inner Bladder and Related Apparatus and Method," all of which are hereby incorporated by reference in their entirety as part of the present disclosure.

BACKGROUND OF THE INVENTION

Field of the Invention

The present invention relates to devices, such as containers, defining variable-volume storage chambers and methods of making such devices, and more particularly, to such devices with co-extruded outer bodies and inner bladders and to related methods.

Background Information

One of the drawbacks of current devices for storing products, such as food or medicinal products, is that the multiple parts of the devices must be manufactured separately, such as by molding, and then assembled together. This can be particularly time consuming and expensive when the devices are used for storing sterile food products, medicinal products, or other products requiring that the products be sterile filled and/or maintained sealed with respect to ambient atmosphere during storage and/or use of the device. For example, in devices including flexible bladders defining variable-volume storage chambers and relatively rigid outer bodies or housings, the bladders are formed separately from the outer bodies, and the bladders are filled, or otherwise assembled to the outer bodies and then filled. These multiple assembly steps can be time consuming and expensive and can subject the various parts to contamination.

Accordingly, it is an object of the present invention to overcome one or more of the above-described drawbacks and/or disadvantages of the prior art.

SUMMARY OF THE INVENTION

In accordance with a first aspect, the present invention is directed to a device comprising a first portion including a first polymer, and a second portion that is relatively flexible in comparison to the first portion and includes a second polymer that is substantially not bondable to the first polymer. A chamber of the device is hermetically sealable with respect to ambient atmosphere and is defined by (i) an interior of the second portion, and/or (ii) a space formed between the first and second portions. A third portion of the device includes a third polymer that is bondable to the first and second polymers and fixedly secures the first and second portions to each other.

In some embodiments of the present invention, the first polymer includes first and second monomers, the second polymer includes third and fourth monomers that are different than the first and second monomers and substantially not bondable thereto, and the third polymer includes fifth and sixth monomers. The fifth monomer is at least substantially similar and bondable to the first and/or second monomers for bonding the third polymer to the first polymer, and the sixth monomer is at least substantially similar and bondable to the third and/or fourth monomers for bonding the third polymer to the second polymer. In some such embodiments, the fifth monomer is the same as or substantially the same as the first and/or second monomers, and the sixth monomer is the same as or substantially the same as the third and/or fourth monomers.

In some embodiments of the present invention, the first, second and third portions are co-extruded. In some such embodiments, the first, second and third portions are co-extrusion blow-molded. In some embodiments of the present invention, the first portion defines a relatively rigid outer body, the second portion defines a relatively flexible inner bladder, and the third portion fixedly secures the outer body and/or the inner bladder to the other.

In some embodiments of the present invention, the chamber is a variable-volume storage chamber, and the device further comprises a one-way valve fixedly secured to the first, second and/or third portions of the device and in fluid communication with the chamber. The one-way valve defines a normally closed position that hermetically seals the chamber with respect to the ambient atmosphere, and an open position that allows substance to flow out of the chamber and device through the one-way valve. In some such embodiments, the one-way valve substantially prevents the ingress of bacteria and other contaminants into the chamber in both the closed and open positions.

In some embodiments of the present invention, the one-way valve includes a flexible valve member that is movable from the closed to the open position in response to substance at an inlet to the one-way valve exceeding a valve opening pressure. In some such embodiments, the flexible valve member defines a normally closed axially-extending valve opening. Preferably, the one-way valve further includes a relatively rigid valve seat that engages the flexible valve member in the normally closed position and defines the normally closed axially-extending valve opening therebetween.

In some embodiments of the present invention, the one-way valve includes a valve member formed of an elastic material and including an axially-extending valve portion forming a normally closed, axially-extending valve opening. The valve portion is movable radially between a normally closed position, and an open position with at least a segment of the valve portion spaced radially away from the closed position to connect the valve opening in fluid communication with the variable-volume chamber, and thereby allow the passage of fluid from the variable-volume chamber through the valve opening.

In some embodiments of the present invention, the device further comprises a pump coupled between the variable-volume chamber and the one-way valve for pumping substance from the chamber through the one-way valve. In some such embodiments, the pump is configured to pump discrete portions of substance from the chamber through the one-way valve. During pumping, the one-way valve and chamber maintain any remaining substance in the chamber in an aseptic condition and sealed with respect to ambient atmosphere.

In some embodiments of the present invention, the pump includes a compression chamber, a compressive surface receivable within the compression chamber, and a manually-engageable actuator coupled to the compression chamber and/or compressive surface. The compressive surface and/or compression chamber is movable relative to the other by the manually-engageable actuator between (i) a rest position, and (ii) at least one actuated position for pressurizing fluid within the compression chamber and, in turn, dispensing fluid through the one-way valve. In some such embodiments, the compressive surface and/or compression chamber is movable relative to the other by the manually-engageable actuator between (i) a first position with the compression chamber coupled in fluid communication with the variable-volume chamber for receiving fluid from the variable-volume chamber into the compression chamber, and (ii) a second position with the compressive surface received within the compression chamber, and the compression chamber substantially sealed with respect to the variable-volume chamber to pressurize fluid within the compression chamber and, in turn, dispense pressurized fluid through the one-way valve. In some such embodiments, a flexible member defines on one side thereof the manually-engageable actuator, and defines on another side thereof the compressive surface. In some such embodiments, the flexible member is substantially dome shaped, and the compression chamber is defined by a recess opposing the substantially dome-shaped flexible member.

In some embodiments of the present invention, the pump is co-molded with the one-way valve. In some such embodiments, the pump and one-way valve form a pump and valve assembly including a base defining a valve seat, a relatively flexible manually-engageable actuator for pumping substance through the one-way valve, and a relatively flexible valve member engaging the valve seat and forming a normally closed valve opening therebetween. In some such embodiments, the pump and valve assembly further comprises (i) a penetrable and laser resealable portion, and/or (ii) a one-way filling valve for filling the variable-volume chamber.

In some embodiments of the present invention, the penetrable and laser resealable portion and/or the one-way filling valve is co-molded with the pump and valve assembly. In some such embodiments, the pump and valve assembly includes a support surface formed integral with the base and movable relative thereto. The manually-engageable actuator and valve member are co-molded to the support surface. The support surface is movable into engagement with the base to fixedly secure the support surface to the base and form a fluid-tight seal, and to place the valve member in engagement with the valve seat forming the normally closed valve opening. Preferably, a flexible gasket is formed on the base and engageable between the base and the body to form a fluid-tight seal. In some such embodiments, the gasket is co-molded with the manually-engageable actuator and valve member. In some embodiments of the present invention, the pump and valve assembly further includes an integral or living hinge extending between the support and base for allowing movement of at least one relative to the other.

In some embodiments of the present invention, at least a portion of the pump, the one-way valve, and/or a surface defining the variable-volume chamber is penetrable by an injection member for filling the variable-volume chamber through the injection member with a fluid to be stored therein, and the resulting penetration aperture is thermally resealable such as by applying laser energy thereto.

In accordance with another aspect, the present invention is directed to a device comprising first means for forming an outer surface of the device and including a first polymer. Second means of the device includes a second polymer that is substantially not bondable to the first polymer for forming a relatively flexible inner surface of the device in comparison to the first means, and a chamber that is hermetically sealable with respect to ambient atmosphere and defined by (i) an interior of the second means, and/or (ii) a space formed between the first and second means. Third means of the device includes a third polymer that is bondable to the first and second polymers for fixedly securing the first and second means to each other. In some embodiments of the present invention, the first means is a relatively rigid outer body, the second means is a relatively flexible inner bladder, and the third means is a portion of the device that is bonded to and fixedly secures the body and/or bladder to the other. Preferably, the body, bladder and portion bonded thereto are co-extrusion blow molded.

In accordance with another aspect, the present invention is directed to a method comprising the following steps:

(i) extruding a first portion of a device including a first polymer;

(ii) co-extruding with the first portion a second portion of the device that is relatively flexible in comparison to the first portion, and that includes a second polymer that is substantially not bondable to the first polymer;

(iii) co-extruding a third portion of the device including a third polymer that is bondable to the first and second polymers; and (iv) bonding the third portion to the first and second portions to fixedly secure the first and second portions to the third portion, and forming a chamber that is hermetically sealable with respect to ambient atmosphere defined by (i) an interior of the second portion, and/or (ii) a space formed between the first and second portions.

Some embodiments of the present invention further comprise co-extrusion blow molding the first, second and third portions. Some such embodiments further comprise substantially simultaneously co-extruding the first and second polymers, sequentially co-extruding the third polymer and, in turn, bonding the third polymer to the first and second polymers to fixedly secure the first, second and third portions to each other. Some such embodiments further comprise extruding a first parison of the first polymer, co-extruding a second parison of the second polymer within the first parison, sequentially co-extruding a third parison of the third polymer, and bonding the third polymer to each of the first and second polymers.

Some embodiments of the present invention further comprise co-molding a pump and one-way dispensing valve assembly, and fixedly securing the pump and one-way dispensing valve assembly to the first, second and/or third portions. The one-way dispensing valve is in fluid communication with the variable-volume chamber, and the variable-volume chamber is hermetically sealed with respect to ambient atmosphere.

In some embodiments of the present invention, the co-molding step includes co-molding as part of the pump and valve assembly (i) a penetrable and thermally resealable portion, and/or (ii) a one-way filling valve. In some such embodiments, the co-molding step includes co-molding as part of the pump and valve assembly a penetrable and thermally resealable portion. In these embodiments, the aseptic filling step includes penetrating the penetrable and thermally resealable portion with an injection member placed in fluid communication with the variable-volume chamber, filling the variable-volume chamber through the injection member, withdrawing the injection member, and thermally resealing, such as by applying laser energy to, a resulting penetration aperture formed in the penetrable and thermally resealable portion.

In some embodiments of the present invention, the co-molding step includes co-molding as part of the pump and valve assembly a one-way filling valve in fluid communication with the variable-volume chamber. In these embodiments, the aseptic filling step includes placing a filling member in fluid communication with an inlet of the one-way filling valve; filling the sterile fluid through the filling member and one-way filling valve and into the variable-volume chamber; removing the filling member from the one-way filling valve; and sealing the variable-volume chamber with respect to ambient atmosphere with the one-way filling valve.

Some embodiments of the present invention further comprise forming a sealed, empty, sterile variable-volume chamber. In some such embodiments, the step of forming a sterile variable-volume chamber includes subjecting the sealed, empty, variable-volume chamber to radiation. In some such embodiments, the radiation is gamma radiation. Some embodiments of the present invention comprise the steps of co-molding the pump and valve assembly or other device closure; co-extruding the first, second and third portions of the device, such as the relatively rigid outer body, flexible inner bladder, and neck; upon molding the two parts, promptly assembling the closure to the neck in an aseptic environment, such as under an overpressure of sterile air, and thereby forming a sealed, empty, sterile variable-volume chamber. Some embodiments of the present invention further comprise aseptically filling the sealed, empty, variable-volume chamber with a sterile fluid.

One advantage of the device and method of the present invention is that the first portion, such as the outer body of the container or other device, and the second portion, such as the inner bladder of the container or other device, can be molded at the same time as one part. Yet another advantage of some currently preferred embodiments of the present invention is that the pump and valve assembly, and/or the pump, penetrable and thermally resealable stopper or filling valve, and dispensing valve assembly, can be co-molded in one part, and attached to the outer body and flexible inner bladder, thus forming such device in approximately two parts.

Other advantages of the present invention and/or of the preferred embodiments thereof will become more readily apparent in view of the following detailed description of the currently preferred embodiments and accompanying drawings.

BRIEF DESCRIPTION OF THE DRAWINGS

FIG. 2 is a somewhat schematic, cross-sectional view of the device of FIGS. 1A, 1B, and 1C including a pump and dispensing valve assembly fixedly secured to the neck and forming a fluid-tight seal therebetween for pumping discrete portions of fluid through the one-way valve, and maintaining the fluid remaining in the variable-volume storage chamber sealed with respect to the ambient atmosphere;

DETAILED DESCRIPTION OF EMBODIMENTS OF THE INVENTION

Figure 1C:
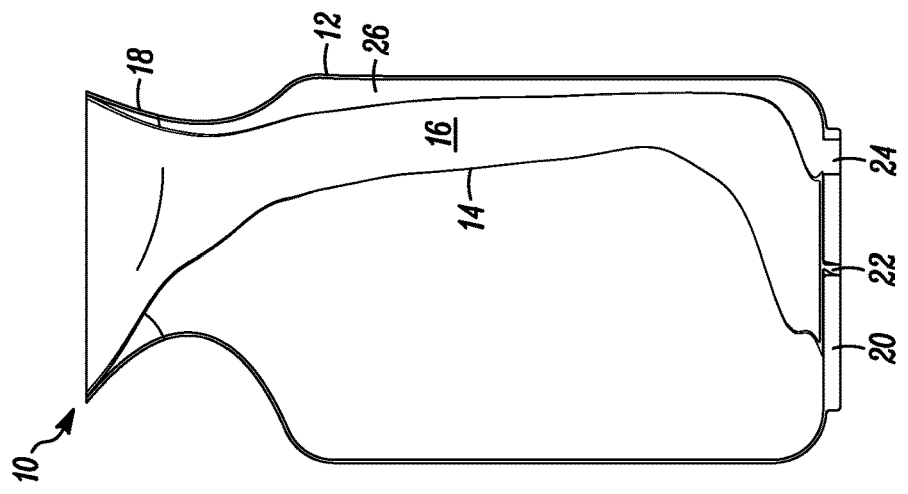
FIGS. 1A, 1B and 1C are somewhat schematic, partial cross-sectional views of a device embodying the present invention, including a relatively rigid outer body, a flexible inner bladder defining a variable-volume storage chamber, and a neck, that are co-extrusion blow molded as one part, and showing in FIG. 1A the filled inner bladder, in FIG. 1B the inner bladder with a portion of the stored fluid dispensed therefrom, and in FIG. 1C the empty bladder after substantially all of the fluid is dispensed therefrom.
Figure 1B:
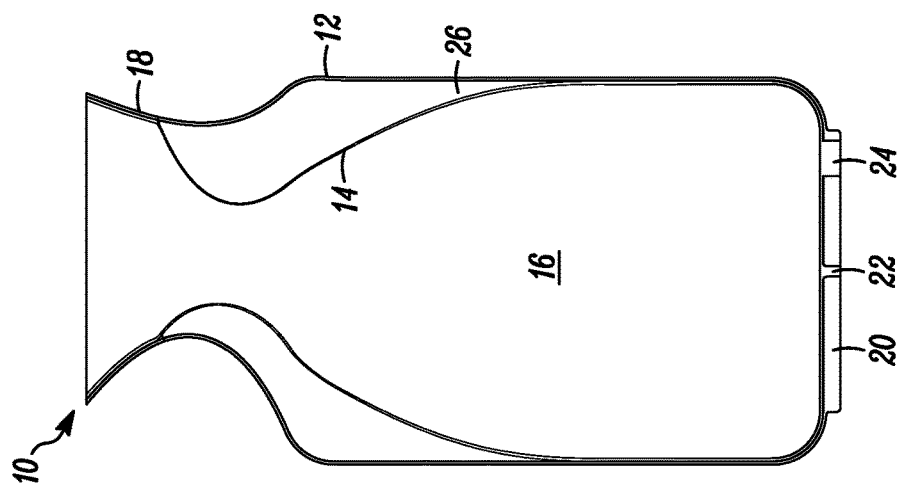
Figure 1A:
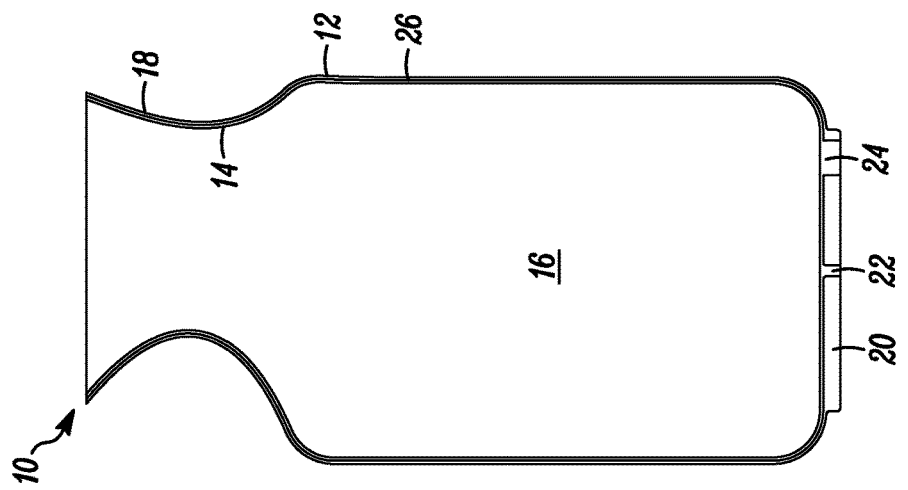

In FIGS. 1A, 1B and 1C, a device embodying the present invention is indicated generally by the reference numeral 10. The device 10 includes a first portion or relatively rigid outer body 12 including a first polymer, and a second portion or relatively flexible inner bladder 14 that is relatively flexible in comparison to the outer body, and includes a second polymer that is substantially not bondable to the first polymer. A chamber 16 of the device is hermetically sealable with respect to ambient atmosphere and is defined by an interior of the inner bladder 14. Alternatively, if desired, the chamber 16 may be defined by a space formed between the first and second portions 12 and 14, respectively, such as a space 26 formed between the flexible inner bladder 14 and outer body 12. A third portion 18 of the device 10 defines a neck of the container that fixedly secures the outer body 12 and flexible inner bladder 14 to each other. The neck 18 includes a third polymer that is bondable to the first and second polymers to fixedly secure the outer body 12 and flexible inner bladder 14 to each other. As described further below, in the illustrated embodiments of the invention, the first, second and third portions 12, 14 and 18, respectively, are co-extruded, and preferably are co-extrusion blow-molded.

In the illustrated embodiments, the first polymer forming the outer body 12 includes first and second monomers, the second polymer forming the flexible inner bladder 14 includes third and fourth monomers that are different than the first and second monomers and substantially not bondable thereto, and the third polymer forming the neck 18 includes fifth and sixth monomers. The fifth monomer is at least substantially similar and bondable to the first and/or second monomers for bonding the third polymer/neck 18 to the first polymer/outer body 12, and the sixth monomer is at least substantially similar and bondable to the third and/or fourth monomers for bonding the third polymer/neck 18 to the second polymer/flexible inner bladder 14. In the illustrated embodiment, the fifth monomer is the same as or substantially the same as the first and/or second monomers, and the sixth monomer is the same as or substantially the same as the third and/or fourth monomers. As may be recognized by those of ordinary skill in the pertinent art based on the teachings herein, the first, second and third polymers, and the monomers forming each of the polymers, may take the form of any of numerous different polymers and/or monomers that are currently known, or that later become known, for performing the functions of the polymers and monomers as described herein. Further, the devices may take any of numerous different configurations, and the components of the devices may take any of numerous different physical and/or chemical characteristics, that are currently known, or that later become known. In the exemplary illustrated embodiment, the outer body 12 may be relatively rigid in comparison to the flexible inner bladder 14, but nevertheless may be manually squeezable to pressurize the inner bladder 14 and, in turn, pressure the fluid or other substance within the variable-volume chamber to dispense fluid or other substance therefrom.

As shown in FIGS. 1A-1C, the outer body 12 defines a relatively rigid base 20 that is co-molded with, and fixedly engages a base portion 22 of the flexible inner bladder 14 to fixedly secure the base of the bladder to the base of the outer body, and to form a fluid tight seal at the base of the inner bladder. The base 20 of the outer body 12 further defines a fluid flow aperture 24 that extends through the base and is in fluid communication with the second variable-volume chamber 26 located between the flexible inner bladder 14 and relatively rigid outer body 12. The fluid flow aperture 24 allows fluid, such as air, to flow from the ambient atmosphere into the second variable-volume chamber 26 to accommodate changes in volume in the first variable-volume chamber 16, for example, after dispensing fluid therefrom. In the illustrated embodiment, the fluid flow aperture 24 is in the nature of a pin hole; however, as may be recognized by those of ordinary skill in the pertinent art based on the teachings herein, the fluid-flow aperture 24 may take any of numerous different configurations that are currently known, or that later become known. For example, if desired, the fluid-flow aperture 24 may include within it or otherwise be defined as a one-way valve, such as an air check valve, that allows air to flow into the second variable-volume chamber 26 as fluid is dispensed from the first variable-volume chamber 16. In one such embodiment, the check valve allows the air in the second variable-volume chamber 26 to become pressurized upon manually squeezing the outer body 12 to, in turn, pressurize the fluid or other substance in the first variable-volume chamber 16 and, for example, facilitate dispensing such fluid or other substance.

Figure 3:
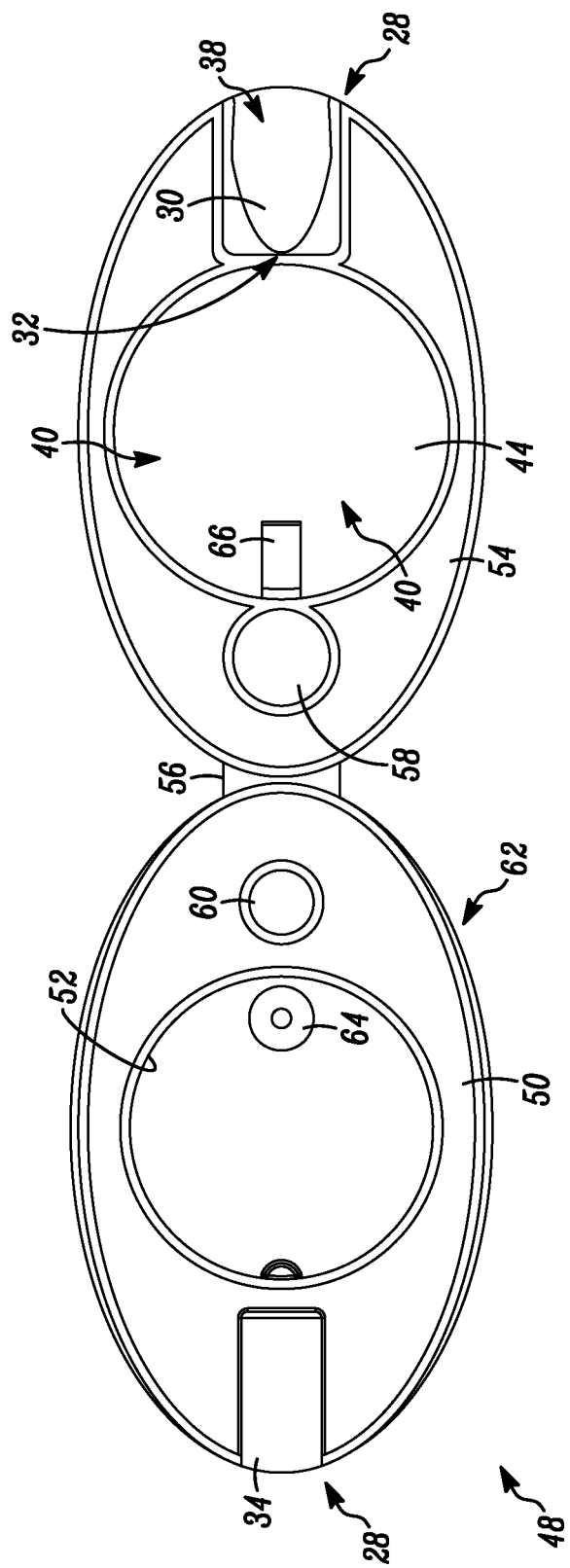
FIG. 3 is a top plan view of an open pump and valve assembly in an embodiment of an invention prior to assembly to the neck including a co-molded pump, dispensing valve, and needle penetrable and laser resealable stopper for needle filling the variable-volume storage chamber, and laser resealing the resulting needle aperture to seal the variable-volume storage chamber with respect to the ambient atmosphere.
Figure 4:
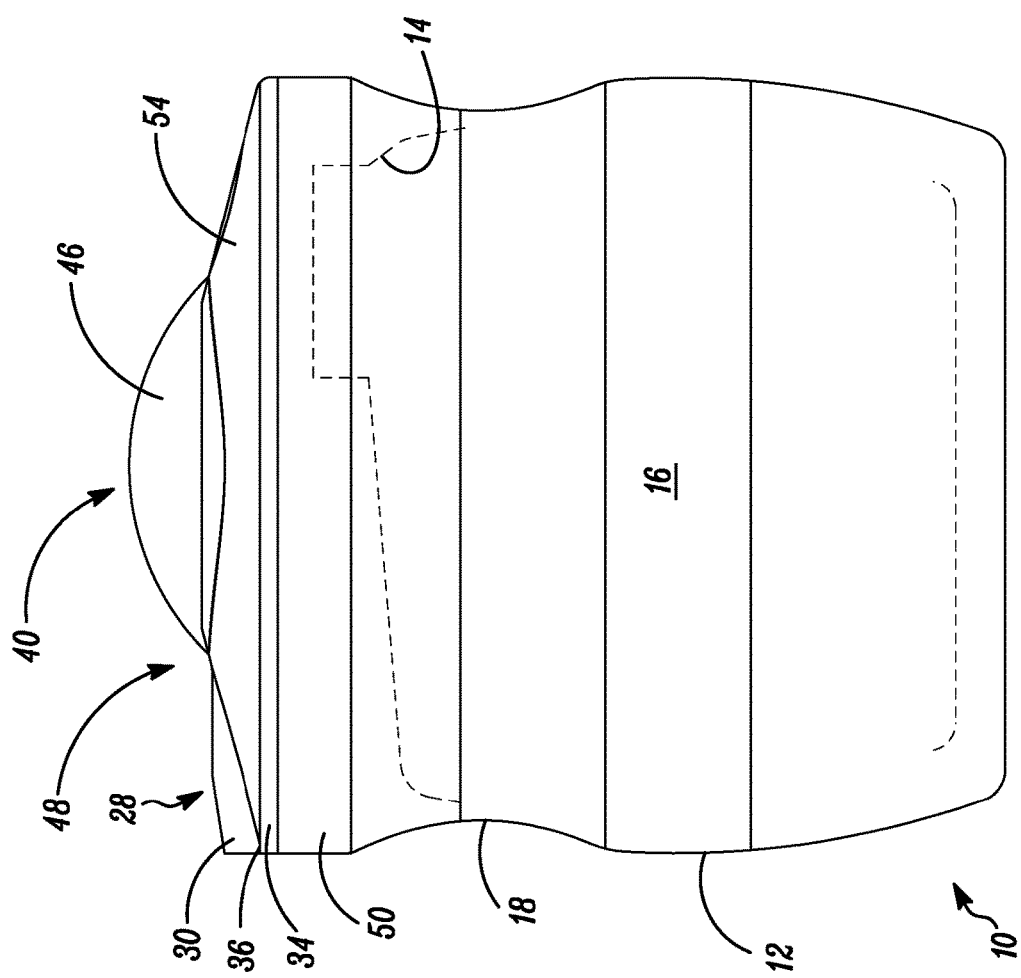
FIG. 4 is a somewhat schematic, elevational view of an assembled device using the pump and valve assembly of FIG. 3 in an embodiment of the invention.

Also in the illustrated embodiments, the chamber 16 is a variable-volume storage chamber, and as shown in FIGS. 2 through 4, the device 10 further comprises a one-way dispensing valve 28 fixedly secured to the neck 18 and in fluid communication with the first variable-volume chamber 16. The one-way valve 28 defines a normally closed position that hermetically seals the first variable-volume chamber 16 with respect to the ambient atmosphere, and an open position that allows substance to flow out of the chamber 16 and device through the one-way valve 28. Preferably, such as in the application of the device for food products, such as sterile foods, or medicinal products, the one-way valve 28 substantially prevents the ingress of bacteria and other contaminants into the chamber 16 in both the closed and open positions (i.e., throughout storage and the period of dispensing of product from the device).

As shown in FIG. 3, the one-way valve 28 includes a flexible valve member 30 that is movable from the closed to the open position in response to substance at an inlet 32 to the one-way valve exceeding a valve opening pressure. The one-way valve 28 includes a relatively rigid valve seat 34 that engages the flexible valve member 30 in the normally closed position, and defines a normally closed axially-extending valve opening 36 therebetween. The valve member 30 is formed of an elastic material and includes an axially-extending valve portion 38 forming the normally closed, axially-extending valve opening 36. The valve portion 38 is movable radially between a normally closed position, and an open position with at least a segment of the valve portion 38 spaced radially away from the closed position to connect the valve opening 36 in fluid communication with the variable-volume chamber 16, and thereby allow the passage of fluid from the variable-volume chamber 16 through the valve opening 36.

The device 10 further comprises a pump 40 coupled between the variable-volume chamber 16 and the one-way valve 28 for pumping substance from the chamber 16 through the one-way valve 28. The pump 40 is configured to pump discrete portions of substance from the chamber 16 through the one-way valve 28. During pumping, the one-way valve 28 and chamber 16 maintain any remaining substance in the chamber in an aseptic condition and sealed with respect to ambient atmosphere.

As shown in FIGS. 2 and 3, the pump 40 includes a compression chamber 42, a compressive surface 44 receivable within the compression chamber 42, and a manually-engageable actuator 46 overlying the compressive surface 44 in fluid communication with the compression chamber. The compressive surface 44 and/or compression chamber 42 is movable relative to the other by the manually-engageable actuator 46 between (i) a rest position, as shown typically in FIG. 4, and (ii) at least one actuated position for pressurizing fluid within the compression chamber 42 and, in turn, dispensing fluid through the one-way valve 28. In the illustrated embodiment, the compressive surface 44 and/or compression chamber 42 is movable relative to the other by the manually-engageable actuator 46 between (i) a first position, as shown typically in FIG. 4, with the compression chamber 42 coupled in fluid communication with the variable-volume chamber 16 for receiving fluid from the variable-volume chamber into the compression chamber, and (ii) a second position (not shown) with the compressive surface 44 received within the compression chamber 42 to pressurize fluid within the compression chamber and, in turn, dispense pressurized fluid through the one-way valve 28. In the illustrated embodiment, a flexible, substantially dome-shaped member defines on one side thereof the manually-engageable actuator 46, and defines on opposite side thereof the compressive surface 44, and the compression chamber 42 is defined by a recess opposing the substantially dome-shaped flexible member.

Also in the illustrated embodiments, the pump 40 is co-molded with the one-way valve 28. As shown in FIG. 3, the pump and one-way valve form a pump and valve assembly 48 including a base 50 defining the valve seat 34, and an inlet opening 52 in fluid communication between the compression chamber 42 of the pump and the variable-volume chamber 16. The inlet opening 52 may have an inlet 64 in fluid communication with the variable volume storage chamber. The pump and valve assembly 48 further comprises a support 54 that is co-molded with the base 50, and a flexible hinge 56 (or "living hinge") extending between the support 54 and base 50 that allows the support 54 to be folded over the base and fixedly secured thereto to assemble the pump and valve assembly. The support may further have a seal 66 in register with the inlet 64. The support 54 includes molded thereon the relatively flexible manually-engageable actuator 46 and underlying compressive surface 44 for pumping substance through the one-way valve, and the relatively flexible valve member 30 that engages the valve seat 34 when the support 54 is folded over and assembled to the base 50 forming an interference fit therebetween and defining the normally closed valve opening 36.

The pump and valve assembly 48 further comprises a penetrable and thermally resealable portion 58 that is co-molded to the support 54 and overlies an aperture 60 in the base 50 when attached thereto. The penetrable and thermally resealable portion 58 allows filling therethrough of the variable-volume chamber 16 with a needle or like injection member, and thermal resealing of the resulting penetration aperture, such as by applying laser radiation thereto.

Figure 5:
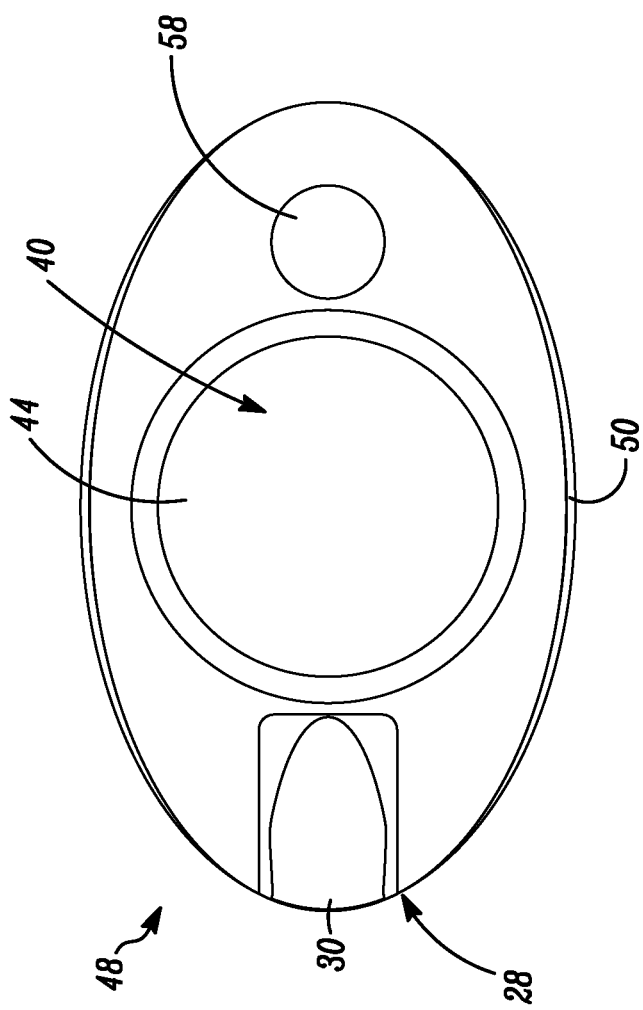
FIG. 5 is a top view of the assembled device of FIG. 4.

As show in FIGS. 3, 4 and 5, the support 54 is movable into engagement with the base 50 to fixedly secure the support to the base and form a fluid-tight seal therebetween (i.e., the base of the dome-shaped actuator engages the surface defining the corresponding inlet aperture 52, and the needle penetrable and thermally resealable portion 58 engages the surface defining the corresponding aperture 60 to form fluid-tight seals therebetween), and to place the valve member 30 in engagement with the valve seat 34 and form the normally closed valve opening 36 therebetween. Further, seal 66 is placed into register with the inlet 64 so as to seal the compression chamber 42 with respect to the variable volume storage chamber 16 during pressurization of the fluid in the compression chamber 42. The seal 66 is of a material, as would be known to those in the art, so as to be sufficiently displaceable from the inlet 64 so fluid may be received from the variable-volume chamber 16 into the compression chamber 42. As shown in FIG. 3, a flexible gasket 62 is formed on the base 50 and is engageable between the base and the neck 18 to form a fluid-tight seal therebetween. In the illustrated embodiment, the gasket 62 is co-molded with the manually-engageable actuator 46, valve member 30 and needle penetrable and thermally resealable portion 58. However, as may be recognized by those of ordinary skill in the pertinent art based on the teachings herein, these components can be molded separately and then assembled, or otherwise formed in any of numerous different ways that are currently known, or that later become known.

The currently preferred embodiment of the device 10 is manufactured in accordance with the following steps:

(i) extruding the first portion or body 12 that includes the first polymer;

(ii) co-extruding with the first portion or body 12 the second portion or flexible inner bladder 14 that includes the second polymer that is substantially not bondable to the first polymer;

(iii) co-extruding the third portion or neck 18 that includes the third polymer that is bondable to the first and second polymers; and (iv) bonding the third portion or neck 18 to the first and second portions or body and flexible inner bladder 12 and 14, respectively, to fixedly secure the body and inner bladder to the neck.

In the illustrated embodiment, the body 12, bladder 14 and neck 18 are co-extrusion blow molded. Preferably, the method of manufacture involves substantially simultaneously co-extruding the first and second polymers, sequentially co-extruding the third polymer and, in turn, bonding the third polymer (or neck 18) to the first and second polymers (or body 12 and inner bladder 14) to fixedly secure the body, bladder and neck to each other. More specifically, the method of manufacture includes extruding a first parison of the first polymer, co-extruding a second parison of the second polymer within the first parison, sequentially co-extruding a third parison of the third polymer, and bonding the third polymer (or neck) to each of the first and second polymers (or body and bladder).

As described above, the pump and one-way dispensing valve assembly 48 is co-molded and fixedly secured to the neck 18 to thereby form the variable-volume chamber 16 that is hermetically sealed with respect to ambient atmosphere. Upon assembly, the one-way dispensing valve 28 is in fluid communication with the variable-volume chamber 16, and the variable-volume chamber 16 is hermetically sealed with respect to ambient atmosphere.

The device defining the sealed, empty, variable-volume chamber is then sterilized such as by applying gamma radiation thereto. Alternatively, as described above, the pump and valve assembly may be assembled to the neck promptly upon molding when both parts are sterile or substantially sterile due to the heat of molding. The sterile parts are preferably automatically assembled promptly upon molding, such as at the time of discharge from the molds or shortly thereafter, such as with a robot or other automated assembly device, under an overpressure of sterile air or other gas to form the device with an empty, sterile, variable-volume chamber.

The sealed, empty device defining the sterile variable-volume chamber then may be aseptically filled. In the illustrated embodiment, the aseptic filling includes penetrating the penetrable and thermally resealable portion 58 with an injection member (not shown) placed in fluid communication with the variable-volume chamber 16, filling the variable-volume chamber through the injection member, withdrawing the injection member, and thermally resealing, such as by applying laser energy to, a resulting penetration aperture formed in the penetrable and thermally resealable portion.

In an alternative embodiment of the invention, rather than include a penetrable and thermally resealable portion, the pump and valve assembly 48 includes a valve-in and vent-out assembly including a one-way filling valve for filling the variable-volume chamber 16 therethrough, and a one-way venting valve for venting gas from the variable volume chamber upon filling the fluid or substance into the variable-volume chamber 16. Preferably, the valve-in and vent-out assembly is co-molded with the pump and valve assembly 48 in the same manner, or substantially the same manner that the penetrable and thermally resealable portion 58 is co-molded with the pump and valve the assembly.

In the alternative embodiments including the valve-in and vent-out assembly, the aseptic filling step includes placing a filling member in fluid communication with an inlet of the one-way filling valve; filling the sterile fluid through the filling member and one-way filling valve and into the variable-volume chamber; removing the filling member from the one-way filling valve; and sealing the variable-volume chamber with respect to ambient atmosphere with the one-way filling valve.

The one-way valve and pump may take the form of any of numerous different valves and/or pumps that are currently known, or that later become known, including any of the one-way valves and/or pumps that are disclosed in the following patents and patent applications that are hereby expressly incorporated by reference in their entireties as part of the present disclosure: U.S. patent application Ser. No. 11/650,102 filed Jan. 5, 2007, entitled "One-Way Valve and Apparatus and Method of Using the Valve," which is a continuation of claims priority to U.S. Provisional Application No. 60/757,161, filed Jan. 5, 2006, U.S. patent application Ser. No. 11/868,820 filed Oct. 8, 2007, entitled "One-Way Valve and Apparatus Using the Valve," which claims priority to U.S. Provisional Application No. 60/644,130 filed Jan. 14, 2005 and U.S. Provisional Application No. 60/633,322 filed Dec. 4, 2004, U.S. application Ser. No. 11/295,274 filed Dec. 5, 2005, entitled "One-Way Valve and Apparatus Using the Valve," now U.S. Pat. No. 7,278,553, which claims priority to U.S. Provisional Application No. 60/644,130 filed Jan. 14, 2005 and U.S. Provisional Application No. 60/633,332 filed Dec. 4, 2004, U.S. application Ser. No. 11/949,104 filed Dec. 3, 2007, entitled "Apparatus for Dispensing Fluids," which is a division of similarly-titled U.S. application Ser. No. 11/900,335 filed Sep. 10, 2007, U.S. application Ser. No. 11/900,332 filed Sep. 10, 2007, entitled "Method for Dispensing Fluids," which claims priority to U.S. Provisional Application No. 60/843,131 filed Sep. 8, 2006, U.S. application Ser. No. 11/900,227 filed Sep. 10, 2007, entitled "Apparatus for Sealing and Engaging Sterile Chambers," which claims priority to U.S. Provisional Application No. 60/843,131 filed Sep. 8, 2006, U.S. application Ser. No. 11/351,716 filed Feb. 10, 2006, entitled "Fluid Dispenser Having a one Way Valve, Pump, Variable Volume Storage Chamber, and a Needle Penetrable and Laser Resealable Portion," U.S. application Ser. No. 10/976,349 filed Oct. 28, 2004, entitled "Container and Valve Assembly for Storing and Dispensing Substances, and Related Method," and U.S. application Ser. No. 11/935,194, filed Nov. 5, 2007, entitled "Dispenser and Method for Storing and Dispensing Sterile Food Product," now U.S. Pat. No. 7,290,573.

Similarly, the penetrable and thermally resealable portion may take the form of any of numerous different penetrable and thermally resealable portions, that may be formed or otherwise provided on any portion of the device, and that may be filled with any of numerous different apparatus or methods that are currently known, or that later become known, including any apparatus and methods disclosed in the following patents and patent applications that are hereby expressly incorporated by reference in their entireties as part of the present disclosure: U.S. Patent Application Ser. No. 60/981,107, entitled "Container Having a Closure and Removable Resealable Stopper for Sealing a Substance Therein," filed on Oct. 18, 2007; U.S. Patent Application Ser. No. 60/997,675 filed Oct. 4, 2007, entitled "Apparatus and Method for Formulating and Aseptically Filling Liquid Products;" U.S. patent application Ser. No. 12/245,678, filed Oct. 3, 2008, entitled "Apparatus For Formulating And Aseptically Filling Liquid Products;" U.S. patent application Ser. No. 12/245,681, filed Oct. 3, 2008, entitled "Method For Formulating And Aseptically Filling Liquid Products;" U.S. patent application Ser. No. 11/408,704 filed Apr. 21, 2006, now U.S. Pat. No. 7,243,689; U.S. patent application Ser. No. 10/766,172 filed Jan. 28, 2004, entitled "Medicament Vial Having A Heat-Sealable Cap, And Apparatus and Method For Filling The Vial;" which is a continuation-in-part of similarly titled U.S. patent application Ser. No. 10/694,364, filed Oct. 27, 2003, which is a continuation of similarly titled co-pending U.S. patent application Ser. No. 10/393,966, filed Mar. 21, 2003, which is a divisional of similarly titled U.S. patent application Ser. No. 09/781,846, filed Feb. 12, 2001, now U.S. Pat. No. 6,604,561, issued Aug. 12, 2003, which, in turn, claims the benefit of similarly titled U.S. Provisional Application Ser. No. 60/182,139, filed Feb. 11, 2000; similarly titled U.S. Provisional Patent Application No. 60/443,526, filed Jan. 28, 2003; similarly titled U.S. Provisional Patent Application No. 60/484,204, filed Jun. 30, 2003; U.S. patent application Ser. No. 10/655,455, filed Sep. 3, 2003, entitled "Sealed Containers And Methods Of Making And Filling Same;" U.S. patent application Ser. No. 10/983,178 filed Nov. 5, 2004, entitled "Adjustable Needle Filling and Laser Sealing Apparatus and Method;" U.S. patent application Ser. No. 11/901,467 filed Sep. 17, 2007 entitled "Apparatus and Method for Needle Filling and Laser Resealing," which is a continuation of similarly titled U.S. patent application Ser. No. 11/510,961 filed Aug. 28, 2006, which is a continuation of similarly filed U.S. patent application Ser. No. 11/070,440 filed Mar. 2, 2005; U.S. patent application Ser. No. 11/074,513 filed Mar. 7, 2005, entitled "Apparatus for Molding and Assembling Containers with Stoppers and Filling Same;" U.S. patent application Ser. No. 11/074,454 filed Mar. 7, 2005, entitled "Method for Molding and Assembling Containers with Stoppers and Filling Same;" U.S. patent application Ser. No. 11/339,966, filed Jan. 25, 2006, entitled "Container Closure With Overlying Needle Penetrable And Thermally Resealable Portion And Underlying Portion Compatible With Fat Containing Liquid Product, And Related Method;" and U.S. patent application Ser. No. 11/786,206, filed Apr. 10, 2007 entitled "Ready To Drink Container With Nipple And Needle Penetrable And Laser Resealable Portion, And Related Method;" U.S. patent application Ser. No. 11/295,251, filed Dec. 5, 2005, entitled "One-Way Valve, Apparatus and Method of Using the Valve;" U.S. patent application Ser. No. 11/933,272 filed Oct. 31, 2007, entitled "Sealed Containers and Method of Making and Filling Same," which is a continuation of similarly-titled U.S. patent application Ser. No. 11/515,162 filed Sep. 1, 2006; U.S. patent application Ser. No. 11/527,775 filed Sep. 25, 2006 entitled "Sterile Filling Machine Having Needle Filling Station within E-Beam Chamber," which is a continuation of similarly-titled U.S. patent application Ser. No. 11/103,803 filed Apr. 11, 2005, which is a continuation of similarly-titled U.S. patent application Ser. No. 10/600,525; U.S. patent application Ser. No. 11/933,300 filed Oct. 31, 2007 entitled "Device with Needle Penetrable and Laser Resealable Portion and Related Method," and U.S. patent application Ser. No. 11/949,087 filed Dec. 3, 2007, entitled "Device with Needle Penetrable and Laser Resealable Portion and Related Method."

The valve-in and vent-out assembly may take the form of any of numerous different valve-in and valve-out devices that are currently known, or that later become known, that may be formed or otherwise provided on any portion of the device, and that may be filled with any of numerous different apparatus or methods that are currently known, or that later become known, including any of the valve-in and valve-out devices, and any of numerous different apparatus and methods for filling such devices, disclosed in the patents and patent applications incorporated by reference above and in following patents and patent applications that are hereby expressly incorporated by reference in their entireties as part of the present disclosure: U.S. patent application Ser. No. 12/025,362 filed Feb. 4, 2008, entitled "Dispenser and Apparatus and Method for Filling a Dispenser," which is a continuation of similarly titled U.S. patent application Ser. No. 11/349,873 filed Feb. 8, 2006, which is a continuation of similarly titled U.S. patent application Ser. No. 10/843,902 filed May 12, 2004; and U.S. patent application Ser. No. 11/938,103 filed Nov. 9, 2007, entitled "Container and Valve Assembly for Storing and Dispensing Substances, and Related Method."

As may be recognized by those of ordinary skill in the pertinent art based on the teachings herein, numerous changes and modifications may be made to the above-described and other embodiments of the present invention without departing from its scope as defined in the appended claims. For example, any of numerous different materials, including any of numerous different polymers, may be employed that are currently known, or that later become known. Similarly, the device may take the form of any of numerous different devices, including any of numerous different containers, or containers or other devices with or without valves, penetrable and thermally resealable portions, and/or pumps, that are currently known, or that later become known. Further, the devices and methods of the present invention may be used to store and dispense any of numerous different products or substances, including without limitation, food products, such as low acid food products, dairy, milk-based, soy-based, water-based, juice-based or other food products, and pharmaceutical, ophthalmic, dermatological, and vaccine products, and industrial products, such as paints, adhesives, and components of the foregoing products. Although the device and method of the present invention are particularly suited for storing and dispensing sterile products that should be maintained sterile and hermetically sealed with respect to ambient atmosphere during storage and throughout the period of dispensing product from the device, they equally may be used with other products that are not sterile, or that do not require that the product be hermetically sealed with respect to ambient atmosphere. Accordingly, this detailed description of the currently preferred embodiments is to be taken in an illustrative as opposed to a limiting sense.

What is claimed is:

1. A device comprising:
   a first portion including a first polymer;
   a second portion that is relatively flexible in comparison to the first portion and fixedly secured therewith including a second polymer that is substantially not bondable to the first polymer, and a chamber that is hermetically sealable with respect to ambient atmosphere and defined by one or more of (i) an interior of the second portion, or (ii) a space formed between the first and second portions; and
   a closure engaging the first portion and hermetically sealing the chamber with respect to ambient atmosphere, the closure including a penetrable and resealable portion in fluid communication with the chamber and penetrable by one or more of an injection member, a filling member or a needle for introducing substance into the chamber, and a resulting penetration aperture in the penetrable and resealable portion is hermetically resealable to hermetically seal the chamber with respect to ambient atmosphere.

2. A device as defined in claim 1, wherein the first portion defines a relatively rigid outer body, and the second portion defines a relatively flexible inner bladder.

3. A device as defined in claim 1, wherein the device further comprises a one-way valve in or placeable in fluid communication with the chamber, the one way valve including valve seat and a valve member defining a partially annular seam therebetween, wherein the one-way valve further defines a normally closed position that hermetically seals the chamber with respect to the ambient atmosphere, and an open position that allows substance to flow out of the chamber and device through the seam of the one-way valve.

4. A device as defined in claim 1, wherein the second portion is fixedly secured to the first portion by a third portion including a third polymer that is bondable to the first and second polymers.

5. A device as defined in claim 1, wherein the penetrable and resealable portion is hermetically resealable by applying laser radiation or energy thereto.

6. A device as defined in claim 1, wherein the chamber is a variable volume chamber.

7. A device as defined in claim 1, wherein the first portion defines a neck portion and a base portion, and the second portion is fixedly secured to the first portion substantially at the neck portion and substantially at the base portion.

8. A device as defined in claim 1, wherein the chamber is defined by an interior of the second portion, and the first portion is configured to allow ambient atmosphere to flow into a space defined between the first and second portions.

9. A method comprising the following steps:
   forming a first portion of a device including a first polymer;
   forming a second portion of the device that is relatively flexible in comparison to the first portion and includes a second polymer that is substantially not bondable to the first polymer;
   fixedly securing the first portion to the second portion, and forming a chamber that is hermetically sealable with respect to ambient atmosphere defined by one or more of (i) an interior of the second portion, or (ii) a space formed between the first and second portions; and
   engaging a closure with the first portion, and in turn, hermetically sealing the chamber with respect to ambient atmosphere, the closure including a penetrable and resealable portion penetrable by one or more of an injection member, a filling member or a needle for introducing substance into the chamber, and a resulting penetration aperture in the penetrable and resealable portion is hermetically resealable to hermetically seal the chamber with respect to ambient atmosphere;
   wherein, with the closure engaging the first portion, the penetrable and resealable portion is in fluid communication with the chamber.

10. A method as defined in claim 9, further comprising:
    (a) penetrating the penetrable and resealable portion with an injection member, a filling member or a needle and, in turn, placing said injection member, filling member or needle in fluid communication with the chamber;
    (b) introducing substance into the chamber through said injection member, filling member or needle;
    (c) removing said injection member, filling member or needle from the penetrable and resealable portion; and
    (d) hermetically resealing a resulting penetration aperture in the penetrable and resealable portion and, in turn, hermetically sealing the chamber with respect to ambient atmosphere.

11. A method as defined in claim 10, wherein step (d) includes resealing the penetrable and resealable portion by applying laser radiation or energy thereto.

12. A method as defined in claim 9, wherein said engaging step includes forming a one-way valve in or placeable in fluid communication with the chamber, the one way valve including valve seat and a valve member defining a partially annular seam therebetween, wherein the one-way valve further defines a normally closed position that hermetically seals the chamber with respect to the ambient atmosphere, and an open position that allows substance to flow out of the device through the seam of the one-way valve.

13. A method as defined in claim 9, wherein the step of forming a first portion includes forming the first portion with a neck portion and a base portion, and the securing step includes fixedly securing the second portion to the first portion substantially at the neck portion and substantially at the base portion.

14. A method as defined in claim 9, wherein the step of forming a chamber includes forming a chamber defined by an interior of the second portion, and the method further comprises allowing ambient atmosphere to flow into a space defined between the first and second portions.

15. A device comprising:
a first portion defining a relatively rigid outer body;
a second portion defining a relatively flexible inner bladder fixedly secured to the first portion and a chamber defined by one or more of (i) an interior of the second portion, or (ii) a space formed between the first and second portions; and
a closure engaging the first portion and hermetically sealing the chamber with respect to ambient atmosphere, the closure including a penetrable and resealable portion in fluid communication with the chamber and penetrable by one or more of an injection member, a filling member or a needle for introducing substance into the chamber, and a resulting penetration aperture in the penetrable and resealable portion is hermetically resealable to hermetically seal the chamber with respect to ambient atmosphere.

16. A device as defined in claim 15, wherein the penetrable and resealable portion is hermetically resealable by applying laser radiation or energy thereto.

17. A device as defined in claim 15, wherein the chamber is a variable volume chamber.

18. A device as defined in claim 15, wherein the first portion defines a neck portion and a base portion, and the second portion is fixedly secured to the first portion substantially at the neck portion and substantially at the base portion.

19. A device as defined in claim 15, wherein the chamber is defined by an interior of the second portion, and the first portion is configured to allow ambient atmosphere to flow into a space defined between the first and second portions.

20. A method comprising:
aseptically filling a device including a first portion defining a relatively rigid outer body, a second portion defining a relatively flexible inner bladder fixedly secured to the first portion and a chamber defined by one or more of (i) an interior of the second portion, or (ii) a space formed between the first and second portions, and a closure engaging the first portion and hermetically sealing the chamber with respect to ambient atmosphere, the closure including a penetrable and resealable portion in fluid communication with the chamber and penetrable by one or more of an injection member, a filling member or a needle for introducing substance into the chamber, and a resulting penetration aperture in the penetrable and resealable portion is hermetically resealable to hermetically seal the chamber with respect to ambient atmosphere, the filling step including
(a) penetrating the penetrable and resealable portion with an injection member, a filling member or a needle and, in turn, placing said injection member, filling member or needle in fluid communication with the chamber;
(b) introducing substance into the chamber through said injection member, filling member or needle;
(c) removing said injection member, filling member or needle from the penetrable and resealable portion; and
(d) hermetically resealing a resulting penetration aperture in the penetrable and resealable portion and, in turn, hermetically sealing the chamber with respect to ambient atmosphere.

21. A method as defined in claim 20, wherein step (d) includes resealing the penetrable and resealable portion by applying laser radiation or energy thereto.

22. A method as defined in claim 20, wherein the chamber is defined by an interior of the second portion, and the method further comprises allowing ambient atmosphere to flow into a space defined between the first and second portions.

23. A method as defined in claim 20, wherein the device further includes a one-way valve in or placeable in fluid communication with the chamber, the one way valve including valve seat and a valve member defining a partially annular seam therebetween, wherein the one-way valve further defines a normally closed position that hermetically seals the chamber with respect to the ambient atmosphere, and an open position that allows substance to flow out of the chamber and device through the seam of the one-way valve, and the method further includes dispensing substance in the chamber through the valve and out of the device.

24. A method as defined in claim 20, wherein the device further includes a pump, and the dispensing step includes pumping substance in the chamber above a valve opening pressure of the valve and, in turn, through the valve and out of the device.

25. A device comprising:
a first portion defining a relatively rigid outer body;
a second portion defining a relatively flexible inner bladder and a chamber defined by one or more of (i) an interior of the second portion, or (ii) a space formed between the first and second portions hermetically sealed from ambient atmosphere; and
a one-way valve in or placeable in fluid communication with the chamber, the one way valve including valve seat and a valve member defining a partially annular seam therebetween, wherein the one-way valve further defines a normally closed position that hermetically seals the chamber with respect to the ambient atmosphere, and an open position that allows substance to flow out of the device through the seam of the valve.

26. A device as defined in claim 25, further comprising a pump configured to pump substance in the chamber through the valve and out of the device.

27. A device as defined in claim 25, wherein the valve member defines an interference fit with the valve seat and a normally closed valve opening therebetween, and wherein the valve member is movable from the closed to the open position in response to substance at an inlet to the valve exceeding a valve opening pressure.

28. A device as defined in claim 25, wherein the valve prevents the ingress of bacteria and other contaminants into the device in both the closed and open positions.

* * * * *